United States Patent [19]

Furusho

[11] 4,455,516
[45] Jun. 19, 1984

[54] BRUSHLESS MOTOR

[75] Inventor: Hidetaka Furusho, Kakuda, Japan

[73] Assignee: Alps Electric Co., Ltd., Tokyo, Japan

[21] Appl. No.: 431,061

[22] Filed: Sep. 30, 1982

[30] Foreign Application Priority Data

Dec. 18, 1981 [JP] Japan .................. 56-188043[U]

[51] Int. Cl.³ .............................................. H02P 5/06
[52] U.S. Cl. ..................................... 318/254; 310/156; 310/268
[58] Field of Search ................... 318/138, 254, 254 A; 310/156, 268, 68 R, 46, 267

[56] References Cited

U.S. PATENT DOCUMENTS

| 3,646,376 | 2/1972 | Anderson | 310/156 |
| 4,164,690 | 8/1979 | Muller | 318/254 A |
| 4,211,963 | 8/1980 | Muller | 318/138 X |
| 4,260,920 | 4/1981 | Nakamura | 310/156 |
| 4,371,817 | 2/1983 | Muller | 318/138 X |

FOREIGN PATENT DOCUMENTS 55-94575  7/1980  Japan .................. 318/254

Primary Examiner—B. Dobeck
Assistant Examiner—Patrick C. Keane
Attorney, Agent, or Firm—Guy W. Shoup; Gerard F. Dunne

[57] ABSTRACT

A brushless D.C. motor which can provide a speed detection signal or position detection signal continuously even when the speed of rotation of the rotor is reduced includes a ring-shaped driving magnet magnetized to develop N and S poles alternatively; a rotary yoke having a plurality of flanges extending from the outer peripheral edge thereof toward a stationary yoke substantially to the middle of the outer peripheral end surface of the driving magnet in such a manner as to embrace the driving magnet, the flanges extending over two adjacent magnetic poles of different polarities at the boundary between these magnetic poles; and a magnetic-electric transducer element disposed at a position spaced from and opposing to the path of rotation of the flange surfaces adjacent to the stationary yoke and spaced from and opposing to the path of rotation of the outer peripheral end surface of the driving magnet.

4 Claims, 6 Drawing Figures

BRUSHLESS MOTOR

BACKGROUND OF THE INVENTION

The present invention relates to a brushless D.C. motor wherein a speed detection signal or position signal may be received from a magnetic-electric transducer element even when the rotation speed of the rotor is low.

DESCRIPTION OF THE PRIOR ART

Before turning to the description of the invention, an explanation will be made of a conventional D.C. motor to facilitate understanding of the present invention.

Referring first to FIG. 1, there is shown a typical conventional brushless D.C. motor having a rotor 1 composed of a disc-shaped rotary yoke 2 and a ring-shaped driving magnet 3 bonded to the rotary yoke 2 by an adhesive. The driving magnet 3 is magnetized to develop 6 (six) poles including N and S poles arranged alternately.

The motor further has a stationary yoke 6 carrying on its upper face a printed board 8 having a generating coil 7 printed thereon, as shown in FIG. 2. A plurality of driving coils 9 are arranged in an annular form and fixed to the upper surface of the stationary yoke 6. The stationary yoke 6 is further provided with magnetic-electric transducer element 10 adapted for sensing whether the rotor 1 is rotating correctly. The stationary yoke 6 is provided with a support seat at the center of the driving coils 9 arranged in an annular form.

The rotor 1 is rotatably carried, through an armature shaft 5, by a bearing 14 of the housing 13 which is provided on the case 12. This case 12 is fixed to the stationary yoke 6 so that the armature shaft 5 is supported at its lower end by the support seat 11 to permit the rotor 1 to rotate. A reference numeral 15 denotes circuit elements such as a transistor or the like connected to the printed board 8.

The magnetic circuit constituting the generator section of the brushless D.C. motor is formed by the driving magnet 3 utilized as an A.C. generator magnet, generating coil 7 and the stationary yoke 6. The arrangement is such that, as the driving magnet 3 is rotated, the magnetic fluxes interacting with the generating coil 7 are changed to produce in the latter an A.C. voltage as the speed detection signal.

In this conventional brushless D.C. motor, the speed detection signal is produced by causing a change in the magnetic fluxes in the generating coil 7 by making N and S poles of the driving magnet 3 pass the generating coil 7 alternatingly. The number of the magnetic poles which pass the generating coil 7 is determined, therefore, by the number of magnetic poles on the driving magnet 3. Since the number of magnetic poles formed on the driving magnet 3 is not very large, the frequency of the A.C. voltage produced in the generating coil is lowered impractically and the level of the speed detection signal output is lowered, when the rotation speed of the rotor 1 is lowered. When the level of the output signal falls down below a predetermined level, it is extremely difficult to utilize the output as the speed detection signal due to an influence of the switching noise of the driving coil 9.

The frequency of the A.C. voltage produced in the generating coil 7 and the level of the output signal can be increased by increasing the magnetic force of the driving magnet 3 and the number of magnetic poles. In a brushless motor, however, there is a practical limit in increasing the magnetic force and the number of magnetic poles. Therefore, the above-stated problem of the prior art still remains unsolved, even if the magnetic force and the number of magnetic poles are increased as much as possible within the limit afforded by the design.

SUMMARY OF THE INVENTION

Accordingly, it is a primary object of the invention to provide a brushless D.C. motor capable of eliminating the above-described problems of the prior art.

To this end, according to the invention, there is provided a brushless D.C. motor in which a magnetic-electric conversion element is used in place of the generating coil in the conventional motor. More specifically, according to the invention, there is provided a brushless D.C. motor comprising: a ring-shaped driving magnet magnetized to develop N and S poles alternately; a rotary yoke having a plurality of flanges extending from the outer peripheral edge thereof toward a stationary yoke substantially to the middle of the outer peripheral end surface of the driving magnet in such a manner as to embrace the driving magnet, the flanges extending over two adjacent magnetic poles of different polarities at the boundary between these magnetic poles; and a magnetic-electric transducer disposed at a position spaced from and opposing to the path of rotation of the flange surfaces adjacent to the stationary yoke and spaced from and opposing to the path of rotation of the outer peripheral end surface of the driving magnet.

The above and other objects, features and advantages of the invention will become clear from the following description of the preferred embodiment taken in conjunction with the accompanying drawings.

DESCRIPTION OF THE PREFERRED EMBODIMENT

Figure 1:
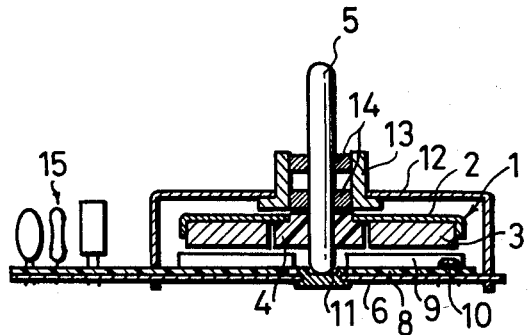
FIG. 1 is a vertical sectional view of a conventional brushless D.C. motor.
Figure 2:
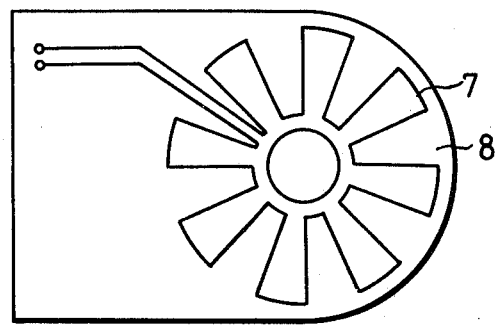
FIG. 2 is a plan view of plate-shaped generating coil of the brushless D.C. motor shown in FIG. 1.
Figure 3:
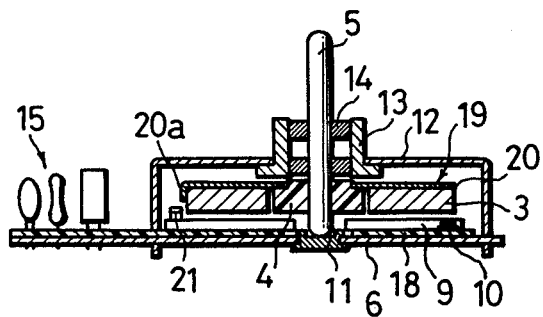
FIG. 3 is a vertical sectional view of a brushless D.C. motor in accordance with an embodiment of the invention.

FIGS. 3 to 6 in combination show a preferred embodiment of the invention in which the same reference numerals are used to denote the same parts or members as those used in the conventional brushless motor explained in connection with FIG. 1.

The brushless motor of the described embodiment has a disc-shaped rotary yoke 20 constituting a part of the rotor 19. The rotary yoke 20 is provided on its outer periphery with three flanges 20a which are arranged at a constant angular pitch and circumferential interval and bent at a right angle toward the stationary yoke 6, in such a manner as to embrace the driving magnet 3. The driving magnet 3 is bonded to the side of the rotary yoke 20 adjacent to the stationary yoke 6 by means of an adhesive. The flanges 20a extend to the middle of the outer peripheral surface of the driving magnet 3 and extend over substantially mid portions of the N and S poles at the juncture between these poles.

A driving coil 9 is superposed on a printed board 18 which is devoid of the generating coil 7 of the conventional motor. The driving coil 9 has four small driving coils 9a each having a substantially triangular shape and arranged to provide a substantially circular form.

Figure 4:
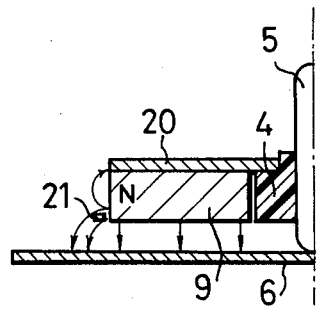
FIG. 4 is a fragmentary enlarged sectional view of an essential part of a brushless D.C. motor shown in FIG. 3.
Figure 5:
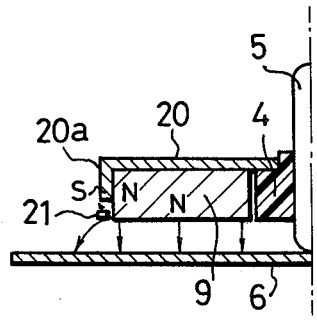
FIG. 5 is a fragmentary enlarged sectional view similar to that in FIG. 4 with a rotational yoke taking a different position.
Figure 6:
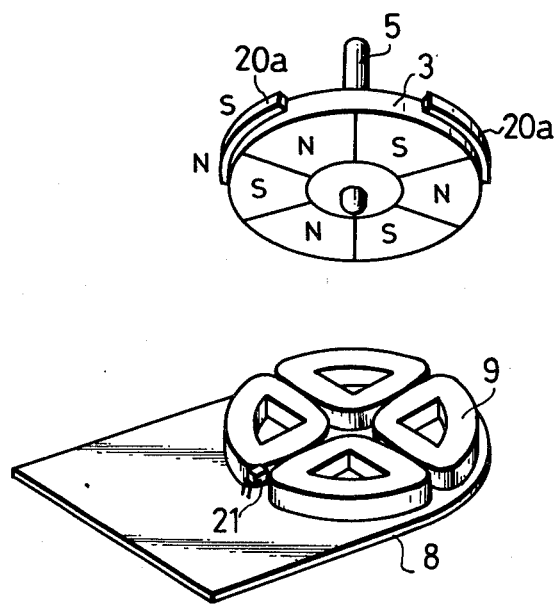
FIG. 6 is an exploded perspective view of the brushless D.C. motor.

As shown in FIGS. 4 and 5, a magnetic-electric transducer element 21 is disposed at a position spaced toward the stationary yoke 6 from the path of rotation of the end surfaces of the flanges 20a adjacent to the stationary yoke and spaced from the path of rotation of the outer peripheral surface of the driving magnet 3. A Hall element capable of producing a large output may be used as the magnetic-electric transducer element 21.

In operation, as the rotor 19 is rotated to a position where the magnetic-electric transducer element 21 opposes those portions of the outer periphery of the rotary yoke devoid of any flange 20a, the rotary yoke 20 covers the upper surface of the driving magnet 3 so that the covered magnet surface forms a closed magnetic path. Therefore, if the driving magnet 3 has N polarity, the magnetic flux leaking from the N pole of the driving magnet 3 is distributed to area where the magnetic resistance is small. Namely, the magnetic flux flows toward the stationary yoke 6 past the outer peripheral portion devoid of a flange 20a, and the magnetic-electric transducer element 21, as shown in FIG. 4. In this state, the magnetic-electric transducer element 21 delivers an output as an N pole.

Then, as the rotor 19 is further rotated to bring a flange 20a of the rotary yoke 20 to the position just above the magnetic-electric transducer element 21 as shown in FIG. 5, the magnetic flux from the N pole of the driving magnet 3 is mainly distributed directly to the stationary yoke 6 as indicated by arrows in FIG. 5 while the remainder portion flows into flange 20a of the rotary yoke 20.

Therefore, the portion of the flange 20a, receiving the magnetic flux from the N pole of the driving magnet 3 and embracing the N pole of the driving magnet 3 is excited to exhibit S polarity. In this state, the magnetic-electric transducer element 21 spaced from and facing the path of rotation of the flange 20a adjacent to the stationary yoke is influenced by the flange 20a which has been magnetized to exhibit S polarity, so that the magnetic-electric transducer 21 produces an output as an S pole.

Although not shown, the portion of the flange 20a embracing the outer peripheral end surface of the S pole portion of the driving magnet 3 is excited to exhibit N polarity, so that the magnetic-electric transducer element 21 exhibits an output as N pole when this position of the flange 20a passes over the magnetic-electronic transducer 21.

In consequence, the number of the magnetic poles which cause a change in the magnetic flux received by the magnetic-electric transducer element 21 is the sum of the number of magnetic poles on the driving magnet and the number of magnetic poles magnetized by the plurality of flanges 20a. That is, the number of the magnetic poles is increased so that the frequency of the A.C. voltage and the level of the output signal produced by the change in the magnetic flux received by the magnetic-electric transducer element 21 can be maintained sufficiently high even if the speed of rotation of the rotor 19 is lowered. The use of the Hall element as the magnetic-electric transducer element further ensures the high level of the output so that it is possible to continuously obtain the speed detection signal from the magnetic-electric transducer element 21 without being affected by the switching noise of the driving coil 9.

In this embodiment, the total number of N and S poles of the driving magnet 3 is 6 (six), and three flanges 20a are provided on the outer periphery of the rotary yoke 20 in such a manner as to extend over adjacent N and S poles. These numbers of the magnetic poles and the flanges are not exclusive and the number of the flanges 20a may be increased or decreased in accordance with increase and decrease of the number of the magnetic poles on the driving magnet 3.

As has been described, according to the invention, a plurality of flanges are formed on the outer periphery of the rotary yoke so as to extend therefrom toward the stationary yoke substantially to the middle of the outer peripheral end surface of the driving magnet in such a manner as to embrace the driving magnet and to extend over adjacent magnetic poles of different polarities at the boundary between these poles. In addition, a magnetic-electric transducer is disposed at a position spaced from and opposing to the path of rotation of the flange end surface adjacent to the stationary yoke and spaced from and opposing to the path of rotation of the outer peripheral end surface of the driving magnet. According to this arrangement, the portions of each flange embracing the outer peripheral end surface of the driving magnet including both of N and S poles show polarities opposite to the polarities of the driving magnet. Thus, the number of the magnetic poles which causes the change in the magnetic flux received by the magnetic-electric transducer element is increased by the number of the magnetic poles excited by the flanges, so that the frequency of the output A.C. voltage is maintained sufficiently high and the level of the output signal is held at such a level as to be free from the influence of the switching noise of the driving coil, even if the rotation speed of the rotor is decreased.

According to the invention, it is thus possible to continuously receive the speed detection signal from the magnetic-electric transducer element even at low rotational speeds of the motor. In addition, this signal can be utilized also as the position detection signal at the time of starting or stopping of the brushless motor.

Although the invention has been described through specific terms, it is to be noted that the described embodiment is only for illustrating purpose and various changes and modifications may be imparted thereto without departing from the scope of the invention which is limited solely by the appended claims.

What is claimed is:
1. A brushless D.C. motor comprising:
 (a) a ring-shaped driving magnet magnetized to develop N and S poles alternately and having a peripheral rim surface;
 (b) a rotory yoke extending over the driving magnet and having a plurality of flanges extending from the outer peripheral edge thereof to the mid portion of the peripheral rim surface of said driving magnet, said flanges extending over two adjacent magnetic poles of different polarities at the boundary between these magnetic poles; and

(c) a magnetic-electric transducer element disposed adjacent to the lower portion of the peripheral rim surface of said driving magnet.

2. A brushless D.C. motor according to claim 1, further comprising means including an additional magnetic-electric transducer element located beside said first-mentioned magnetic-electric transducer element for detecting whether the rotation of the rotor is appropriate or not.

3. A brushless D.C. motor according to claim 1, wherein a Hall element is used as said magnetic-electric transducer element.

4. In a brushless D.C. motor having a rotor including a ring-shaped magnet having sections of opposite magnetic polarity alternating circumferentially therearound, and means including a magnetic-electric transducer element located adjacent the lower rim portion of said magnet for developing signals corresponding to the alternating magnetic field produced during rotation of said magnet, the improvement including means for increasing the alternations of the magnetic field of said magnet during its rotation, said means including a yoke extending over said magnet and having a plurality of flanges extending at least partially down over the rim thereof, each of said flanges extending down over two sections of said magnet of opposite magnetic polarity.

* * * * *